United States Patent [19]

Shikama et al.

[11] Patent Number: 4,789,978

[45] Date of Patent: Dec. 6, 1988

[54] SYSTEM AND METHOD OF ASTIGMATISM CORRECTION IN AN OPTICAL HEAD APPARATUS

[75] Inventors: Shinsuke Shikama; Eiichi Toide, both of Nagaokakyo, Japan

[73] Assignee: Mitsubishi Denki Kabushiki Kaisha, Japan

[21] Appl. No.: 933,805

[22] Filed: Nov. 24, 1986

[30] Foreign Application Priority Data

Dec. 4, 1985 [JP] Japan ................................ 60-274024

[51] Int. Cl.$^4$ ............................................. G11B 7/125
[52] U.S. Cl. ...................................... 369/112; 369/122
[58] Field of Search ................. 250/201 DF; 350/432; 367/44, 45, 46, 100, 112, 109, 110, 121, 122

[56] References Cited

U.S. PATENT DOCUMENTS

| | | | |
|---|---|---|---|
| 4,585,296 | 4/1986 | Minoura et al. | 350/434 |
| 4,592,627 | 6/1986 | Smid | 350/432 |
| 4,612,437 | 9/1986 | Ohsato | 250/201 |
| 4,645,311 | 2/1987 | Rothe | 350/432 |
| 4,678,288 | 7/1987 | Lonsdale et al. | 350/432 |

FOREIGN PATENT DOCUMENTS 60-149941 7/1985 Japan .

OTHER PUBLICATIONS

Tatsuno, K. and Arimoto, A., *Applied Optics*, vol. 20, No. 20/15 Oct. 1981.
SPIE International Symposium on Optical and Opto-electronic Applied Sciences, Jun. 1986, paper.
Harada, *Journal of the Television Engineers of Japan*, 38:807-814 (1984) "Present Status of Plastic Lens".

*Primary Examiner*—Donald McElheny, Jr.
*Attorney, Agent, or Firm*—Saidman, Sterne Kessler & Goldstein

[57] ABSTRACT

An optical head apparatus comprises a laser light source device emitting linearly polarized light, a converging lens for converging the light pencil emitted from the laser light source onto information recording tracks on a recording medium, and an optical system including a beam splitter for separating the light pencil reflected from the recording medium from the light pencil emitted from the laser light source. The converging lens is one formed by molding. The rotary position of the converging lens about the optical axis of the converging lens is so adjusted that the astigmatism of the optical system from the laser light source to the recording medium is minimum.

17 Claims, 7 Drawing Sheets

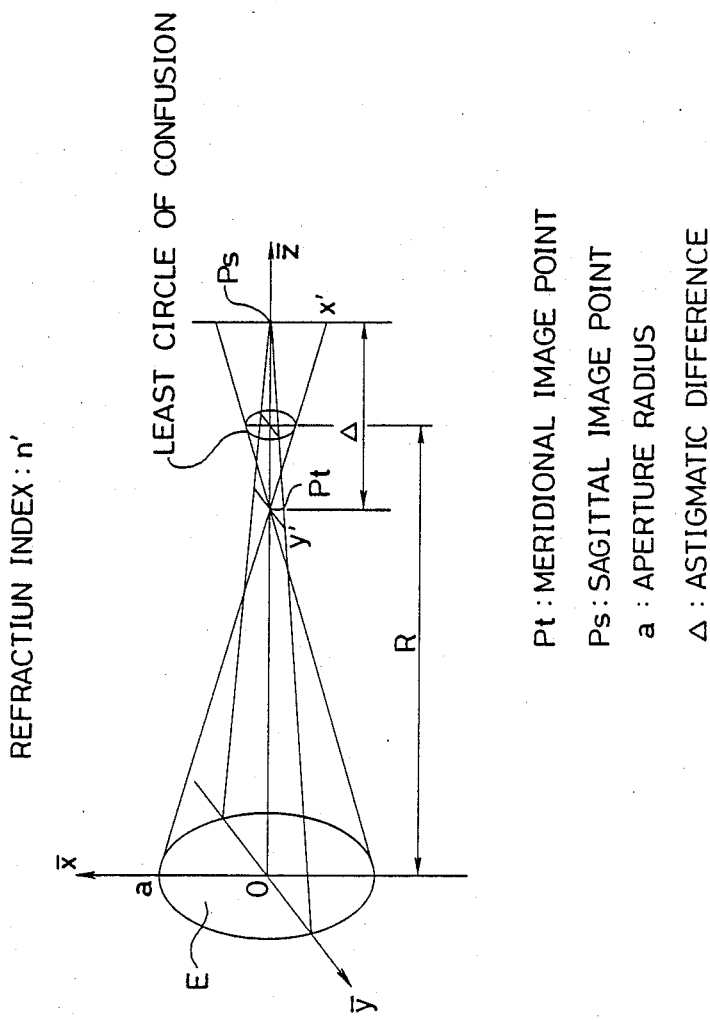

FIG.9(a) FIG.9(b)
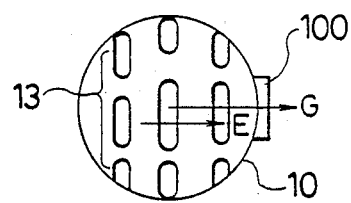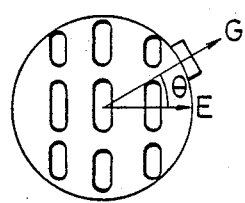
FIG.10
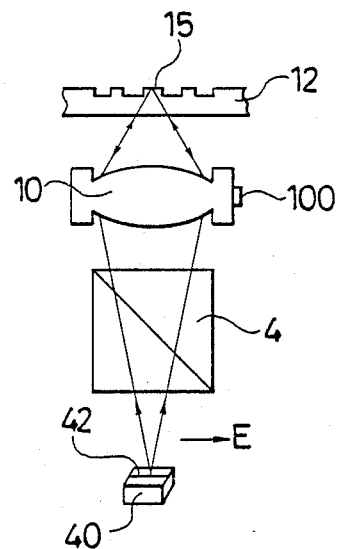

SYSTEM AND METHOD OF ASTIGMATISM CORRECTION IN AN OPTICAL HEAD APPARATUS

BACKGROUND OF THE INVENTION

The present invention relates to an optical head apparatus for writing data in and reading date from an optical disk, a form of an optical information recording medium, and particularly to an improvement for minimizing the astigmatism of a converging optical system in an optical head having a converging lens formed by molding.

The apparatus of this type are shown for example in the following publications:
 (a) Japanese Patent Application Laying-open No. 102342/1983
 (b) Modern Optical Engineering, McGraw-Hill, N.Y. 1966
 (c) Technique for Designing a Lens, pp. 35-36, Kogaku Kogyo Gijutsu Kyokai, Japan
 (d) Optics, p. 156, Wiley, N.Y.
 (e) The Present Status of Plastic Lens, Harada, Journal of the Institute of Television Engineers of Japan, Vol. 38, No. 9 (1984), pp. 810-814.
 (f) Japanese Patent Application Laying-open No. 50335/1982

In addition, a device shown in FIG. 3a and FIG. 3b was known, in which there is provided a light source such as a semiconductor laser 40 which emits a linearly polarized light pencil 2. A diffraction grating 3 splits the incident light pencil (alternatively referred to as a light beam) 2 into three pencils of light. A half prism 4 separates the illuminating light pencil 5 and the reflected light pencil 6 from each other. A collimator lens 7 converts the illuminating light 5 into parallel light pencil 8. A reflection prism 9 reflects the parallel light pencil 8 to a direction substantially at right angles. A converging lens 10 converges the parallel light pencil 11 toward an information track 13 of a disk-shaped recording medium or carrier 12 to form a light spots 14. For this to be achieved, the recording medium 12 is positioned at or close to the focal point of the converging lens 10. To be more exact, the light spots 14 consists of three spots 14a through 14c as shown in FIG. 3b. The information track 13, on the other hand, consists of pits 15 and lands 16. The recording medium 12 is rotated by a drive motor not shown. The light pencil reflected at the recording medium 12 passes through the converging lens 10, and the collimator lens 7 and is reflected at the half prism 4 substantially at right angles. The reflected light pencil 6 passes a concave lens 17 for reducing the angle of convergence of the reflected light pencil. A cylindrical concave lens 18 causes an astigmatism in the light pencil having passed the concave lens 17. A light detector 19 comprises detecting elements 19a through 19c.

The light pencil 2 emitted from the semiconductor laser 40 is linearly polarized in a direction parallel to its PN junction. The light pencil 2 passes through the diffraction grating 3, a half prism 4, and a collimator lens 7, and is deflected by the reflection prism 9, and is converged, forming three beams 14a through 14c, on the recording medium 12. The light pencil as reflected on the recording medium passes through the converging lens 10 and is again reflected at the reflection prism 9, and is then reflected at the half prism 4. The light pencil then passes the concave lens 17 and the cylindrical lens 18 and enters the three detecting elements 19a through 19c of the light detector 19. The central detector 19a receives the reflected light from the light spot 14a, and converts the intensity of the received light into an electrical signal. The intensity of the reflected light differs depending on whether the light spot 11 is reflected in the pit or on the land 16. The electrical signal is used for an audio signal, a video signal, digital data, or the like.

As the recording medium 12 rotates, the surface of the recording medium 12 may vary in position in the direction of optical axis of the object lens 10 because of undulation, vibration and the like. The deviation in the direction of the optical axis from the focal point is detected in a known manner (literature (a)) in accordance with the variation of the shape of the light pencil on the central photodetector 19a, and is corrected by a servo mechanism, not shown, so that the surface of the disc is kept at the foal point.

The rotation of the recording medium also causes relative deviation in the lateral direction between the central beam 14a and the track 13, due to meandering of the track 13 and vibration. To correct the error in the lateral direction, the difference between the outputs of the photodetectors 19b and 19c is detected and used as a representation of the deviation between the track and the spot 14a (which is the relative deviation of the track), and correction is made in accordance with the detected deviation (see the literature (a) mentioned above).

To maximize the density of information stored on the recording medium in such an optical head apparatus, the pit length and the track pitch are made to have the smallest size which allows reading when the converging system from the semiconductor laser to the converging lens is in the ideal state of the diffraction limit. Typically, when the laser wavelength $\lambda=780$ nm, and the numerical aperture of the converging lens at the side of the disc NA=0.5, then the spot diameter obtained by converging at the diffraction limit is about $\lambda/NA=1.6$ microns. The track pitch is therefore 1.6 microns, while the minimum pit length is 0.8 microns, half the minimum spot diameter.

In order for the converging system to have the characteristic of the diffraction limit, it is required that (1) the light emitted from the semiconductor laser 40 should be conducted at or close to the state of stigmatism throughout the entire light path passing the converging lens up to the spot 14, and (2) the semiconductor laser itself does not have any aberration.

In recent years, molded plastic lenses are used as the converging lens of the optical head apparatus. This is along the line of the advancement in the plastic precision molding technique. The plastic lenses can be formed to have aspheric surfaces, if the die is machined by precision NC (numerical controlled) machines. This is in contrast to glass lenses which have to be polished individually and which therefore were generally restricted to spherical surfaces. It is therefore possible to replace conventional combination of three to five spherical glass lenses by a single aspherical plastic lens.

Because the plastic lens can be fabricated by plastic molding which is suitable for mass production, and because the number of lenses can be reduced, the use of the plastic lens contributes to the costdown of the optical head and reduction in the number of assembly steps of the optical head, so that the plastic lenses will be increasingly used in the future design of optical heads.

A disadvantage associated with the plastic lens is the lack of uniformity in the aberration characteristic along the direction of rotation about the optical axis of the lens. More particularly, it has been found that the astigmatism of the molded plastic lens against linearly polarized light varies when the lens is rotated about the optical axis.

SUMMARY OF THE INVENTION

An object of the invention is to solve the abovedescribed problems.

Another object of the invention is to provide an optical head having a converging lens formed of a plastic by molding with an improved characteristic.

A further object of the invention is to minimize the astigmatism in an optical head.

According to the invention, there is provided an optical head apparatus comprising a laser light source device emitting linearly polarized light, a converging lens for converging the light pencil emitted from the laser light source onto information recording tracks on a recording medium, and an optical system including a beam splitter for separating the light pencil reflected from the recording medium from the light pencil emitted from the laser light source, wherein the converging lens is one formed by molding, and the rotary position of the converging lens about the optical axis of the converging lens is so adjusted that the astigmatism of the optical system from the laser light source to the recording medium is minimum.

In a preferred embodiment, the converging lens is so oriented that an astigmatism of the converging lens and an astigmatism of the remaining part of the converging system are made to cancel each other so that the astigmatism of the entire converging system from the laser to the disc is minimized. With such an arrangement, the optical system exhibits the performance of the diffraction limit.

BRIEF DESCRIPTION OF THE DRAWINGS

In the accompanying drawings:

FIG. 4b is a diagram showing rotation of a molded lens as used to provide the experimental data of FIG. 4a.

FIG. 8 is a diagram showing the relationship between the astigmatic difference and the astigmatism; and FIG. 9a and FIG. 9b are diagrams showing the relationship between the direction of the track, the direction of the polarization of the light, and the direction of the gate.

FIG. 10 shows use of a lens of a finite conjugate type to directly receive and converge the light emitted from a semiconductor laser.

DETAILED DESCRIPTION OF THE PREFERRED EMBODIMENTS

Figure 4A:
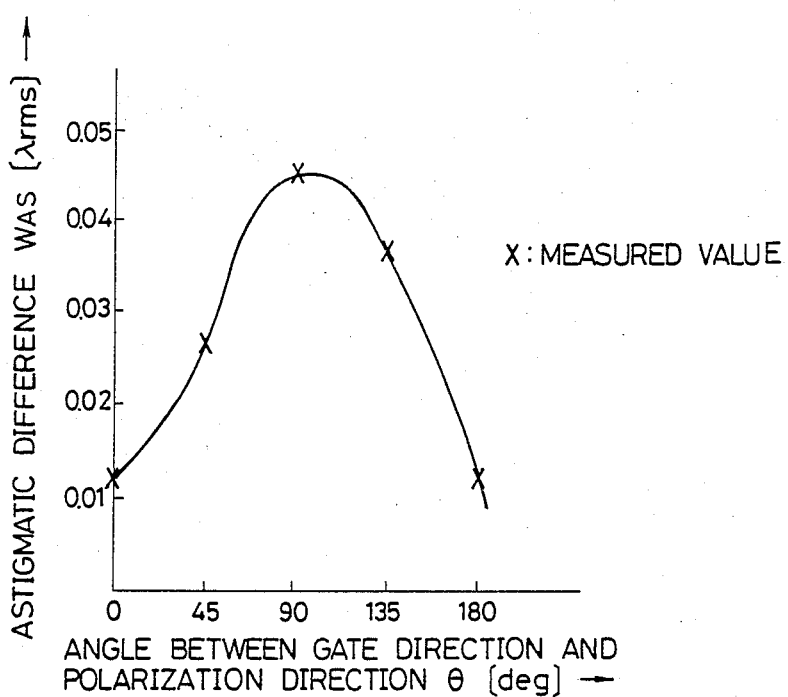
FIG. 4a is a diagram showing data obtained by experiments on the variation in the astigmatism with rotation of a molded lens as shown in FIG. 4b.
Figure 4B:
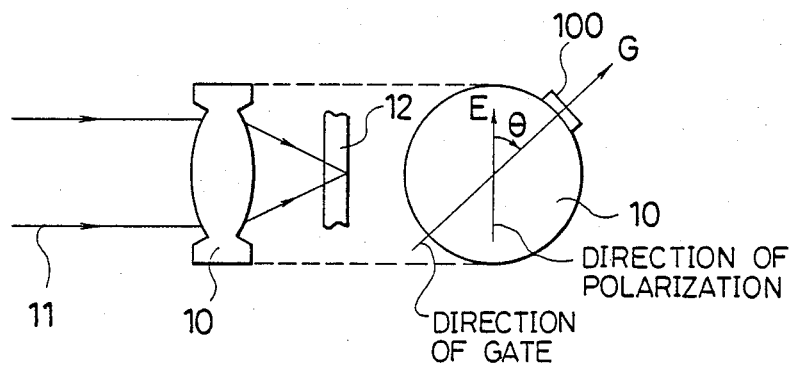

The astigmatism produced by a plastic converging lens will first be discussed in further detail with reference to FIG. 4a and FIG. 4b show a result of measurement of the astigmatism in a situation where a linearly polarized parallel light pencil 11 passes through a plastic lens 10 formed by injection molding, and passes through a substrate of a disc 12 and is converged. The plastic material used is PMMA. The plastic lens has a gate 100 through which the plastic material was injected into the molding die during the injection molding. The angle subtended between the line G connecting the gate 100 and the center of the lens and the direction E of the polarization of the incident light is denoted by $\theta$. In FIG. 4a, the axis of the ordinates $W_{AS}$ represents a standard deviation value (hereinafter referred to as rms value) of the astigmatism, expressed in terms of the wavelength $\lambda$ of the light pencil. The measurement was made using a Fizeau's interferometer which is common in the measurement of the astigmatism of optical parts of an optical head.

As will be seen from the figure, $W_{AS}$ is the smallest (about 0.01 $\lambda$ rms) when the direction of the polarization and the direction of the gate coincide with each other, i.e., when $\theta$ is 0° and 180° while $W_{AS}$ is the largest (about 0.045 $\lambda$ rms) when the direction of the polarization and the direction of the gate are at right angles with each other. The same measurements were conducted on 10 workpieces and the results similar to that illustrated were obtained. According to the literature (e), it is inferred that a plastic lens formed by molding exhibits double refraction due to strain caused by internal residual stress and this is the cause of the variation in the astigmatism.

The conventional optical head is also associated with aberration due to three factors. First, the surface of the parallel plane optical parts such as the diffraction grating 3 and the half mirror 4 through which the light pencil is transmitted is inclined and is not normal with respect to the optical axis of the emitted light pencil 2. Secondly, when the point of light emission of the semiconductor laser is off the optical axis of the collimator lens, an image height is generated so that an astigmatism is generated in the collimated light 8, and at the same time the collimated light enters the object lens and an image height is produced to cause an astigmatism. Thirdly, the light pencil emitted from the semiconductor laser 40 has an astigmatism.

These phenomena will be described in further detail.

(i) Inclination of the diffraction grating or the half prism.

Figure 5:
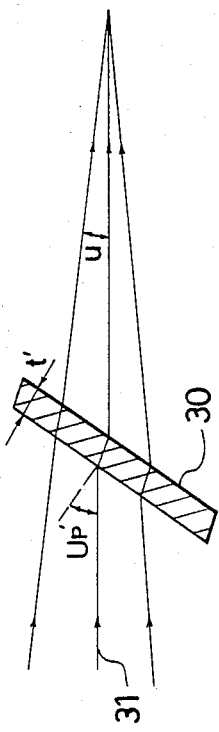
FIG. 5 is a diagram showing how the astigmatism is produced by a parallel plane plate.

The light pencil 2 emitted from the semiconductor laser is a diverging light pencil. For example, assume that, as shown in FIG. 5, a parallel plane glass 30 (numerical aperture NA=sin u) is disposed in an optical path of a converging light pencil, with the parallel plane glass 30 being inclined by Up' with respect to the optical axis 31. The astigmatic difference (astigmatism) which results in such a situation is given by the following equation (1), according to the literature (b).

$$As = ls' - lt' \tag{1}$$

$$= \frac{t'}{\sqrt{N^2 - \sin^2 Up'}} \left[ \frac{N^2 \cos^2 Up'}{(N^2 - \sin^2 Up')} - 1 \right]$$

In the above equation, lt' represents the distance to the point of convergence in the surface (meridional surface) containing the normal to the parallel planes of the glass plate 30 and the optical axis, and ls' represents the distance to the point of convergence in the surface (sagittal surface) normal thereto.

Figure 3A:
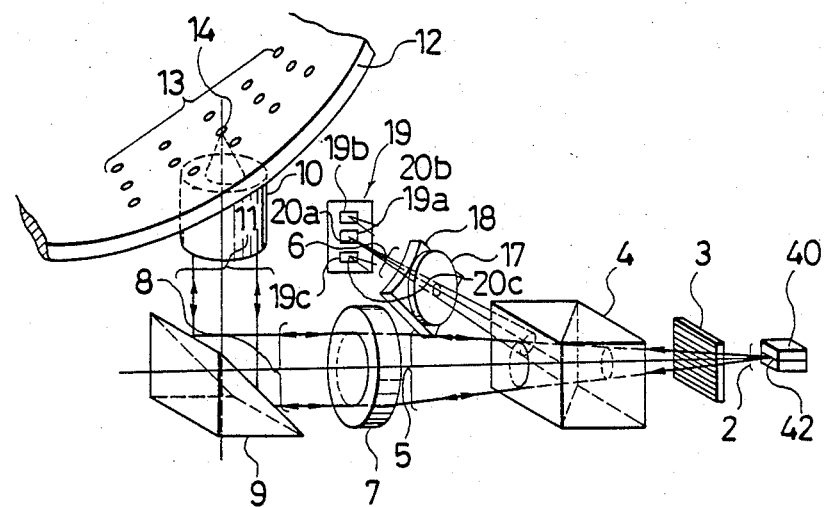
FIG. 3a and FIG. 3b are diagrams showing a conventional optical head.

If, in FIG. 3a showing the conventional system, the diffraction grating 3 or the half prism 4, which is a parallel plane part, is inclined, an astigmatism in accordance with the equation (1) is produced. For instance, if a diffraction grating with a refraction index N=1.5 and t'=1.5 mm, or a half prism with t'=5 mm is inclined by 1.0°, the resultant astigmatic difference will be 0.17 microns or 0.56 microns, respectively.

(ii) Image height due to misalignment of the semiconductor laser.

Figure 6:
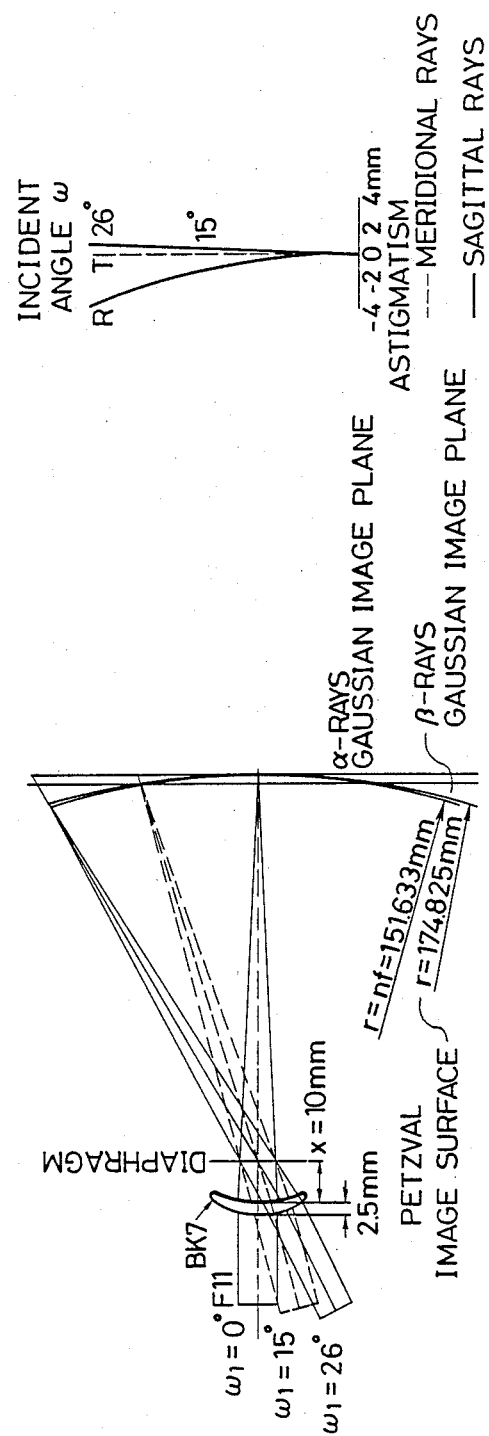
FIG. 6 is a diagram showing how the astigmatism due to image height is produced.

Generally, when the object (which is the point of light emission of the semiconductor laser) is off the optical axis, and an image height exists, then an astigmatism is produced. FIG. 6 shows results of calculation of production of an astigmatism according to literature (c). As shown in the right side of the figure, with increasing image height the point of focusing by the meridional rays and the point of focusing by the sagittal rays are separated from each other and the astigmatism is increased.

As an example, there is a collimator lens for use in an optical head apparatus, which produces an astigmatism of 10 microns for the image height corresponding to the incident angle of 1°, and there is an object lens for use in an optical head apparatus, which produces an astigmatism of 5 microns for the image height corresponding to the incident angle of 1°.

(iii) Astigmatism of the semiconductor laser.

The area of the point of light emission of a semiconductor laser is about 2 microns×0.1 microns, and can be generally regarded as a point.

Figure 7A:
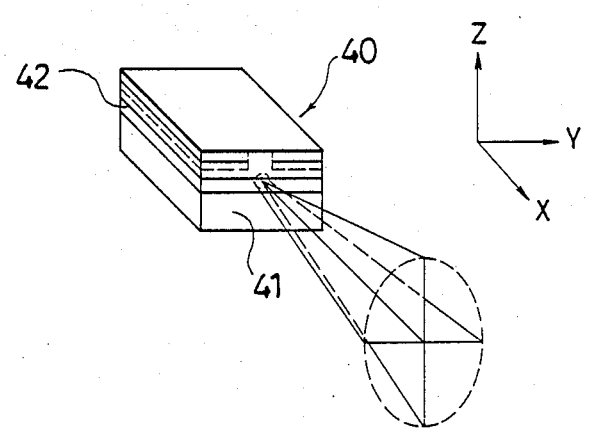
FIG. 7a is a diagram showing construction of a semiconductor laser.
Figure 7B:
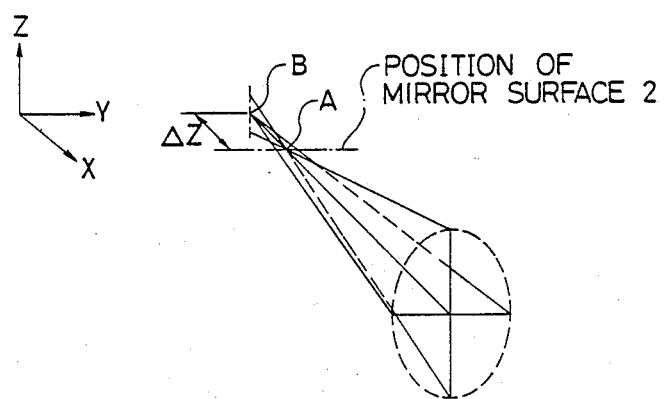
FIG. 7b is a diagram explaining the astigmatism of a semiconductor laser.

FIG. 7a and FIG. 7b shows an example of a double hetero-junction semiconductor laser. As shown in FIG. 7a and FIG. 7b, the beam waist of the light pencil emitted from the semiconductor laser chip 40 may have different dimensions: the value within the plane (x-y plane) of the junction of the semiconductor and the value within the plane (x-z plane) normal thereto may differ. Especially with gain guiding type semiconductor laser, such a difference is large. Within the normal plane (x-y plane), the point A within the mirror surface 41 forms a mode waist, whereas within the junction plane (x-y plane) the point B in the active layer 42 of the semiconductor laser chip 40, i.e., at the back of the mirror surface 41 forms a mode waist. This difference causes an astigmatism. There are a certain semiconductor laser chip of the gain guiding type with which the difference may be as large about 25 microns.

As a criterion for a permissible limit for an optical system accepted as a diffraction limit optical lens, the Marechal's criterion has been used. According to this criterion, the RMS value (Wrms) of the wavefront aberration must be not greater than 0.07 λ: Wrm≦0.07 λ (where λ represents the wavelength of the light).

The relationship between the astigmatic differences discussed above in connection with three types of phenomena and the wavefront deviation will be described with reference to FIG. 8.

In the figure, E represents the excit pupil of a radius a. The coordinate of the pupil is expressed by (x,y). The x-direction lateral aberration x' at the sagital image surface Ps is related to the wavefront aberration W as follow:

$$x' = \frac{R}{n'} \frac{\partial W}{\partial x} \tag{2}$$

When R>>Δ, i.e., when the astigmatism difference is very small, the following equation (3) holds:

$$x' = \frac{\bar{x}}{R} \cdot \Delta \tag{3}$$

Combining the equations (2) and (3), x' can be eliminated, and the wavefront aberration W can be given by the following equation (4), if n' is assumed to be 1 (unity) assuming that surrounding medium is the air.

$$W = \int_0^{\bar{x}} \left( \frac{\partial W}{\partial \bar{x}} \right) dx = \frac{1}{2} \left( \frac{\bar{x}}{R} \right)^2 \Delta \tag{4}$$

The equation (4) represents the astigmatism coefficient in the Seidel's form. If the value of the equation (4) is converted into the standard deviation Wrms of the wavefront aberration at the least circle of confusion which is the best convergence point, the following equation (5) is obtained.

$$Wrms = \frac{1}{4\sqrt{6}} Na^2 \Delta \tag{5}$$

Here, $Na=a/R$, with a representing the radius of the exit pupil as illustrated in FIG. 8.

Thus, if the numerical aperture NA of the system is given, the astigmatic difference Δ satisfying Wrms≦0.07 λ is obtained using the equation (5).

For instance, with an optical head for an optical video disc, a collimating lens having Na of about 0.2 and a semiconductor laser having a wavelength of about 0.8 microns are used. In such a case, the permissible astigmatic difference for the W rms≦0.07 λ is λ≦13.7 microns. The permissible astigmatic difference may be exceeded by the astigmatism due to the phenomena (i), (ii) and (iii) described above, and the converging system as a whole is prevented from functioning as the diffraction limit optical system, and the optical transfer function (OTF) is deteriorated, and hence writing/reading performance is deteriorated.

It should be noted that, in FIG. 7b, R>>Δ.

As has been described, when a plastic lens is used as a converging lens of an optical head apparatus, the plastic lens itself has an astigmatism due to its molding strain. The value may be as large as 0.045 λ. This alone may amount to 60% or more of the permissible aberration 0.07 λ. This has been an obstacle to securing a good writing/reading performance.

The invention aims at providing an optical head apparatus with which the astigmatism due to the strain of the plastic and the astigmatism due to defect in the remainder of the optical system can be minimized and the converging system from the laser to the disc functions optimally as a diffraction limit optical system.

The invention has been accomplished on a finding that the astigmatism of a plastic converging lens varies with variation in the angle of rotation about the optical axis of the lens, i.e., in the direction of the gate.

Figure 1:
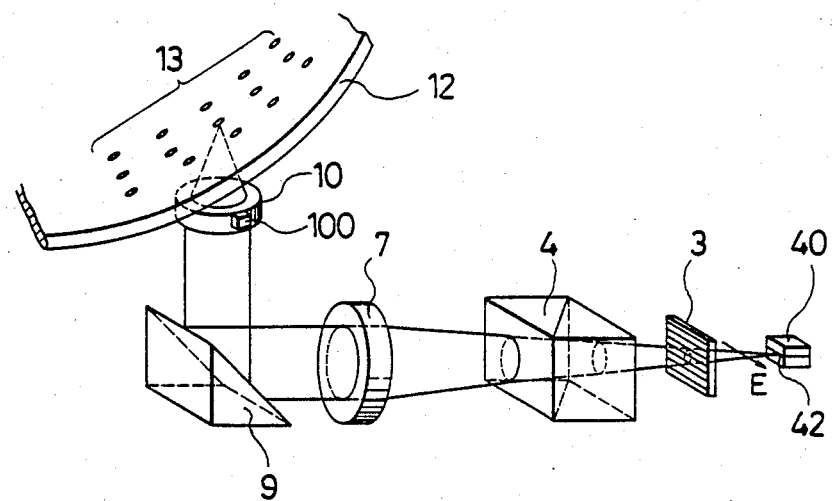
FIG. 1 is a diagram showing an optical head apparatus of an embodiment of the invention.
Figure 3B:
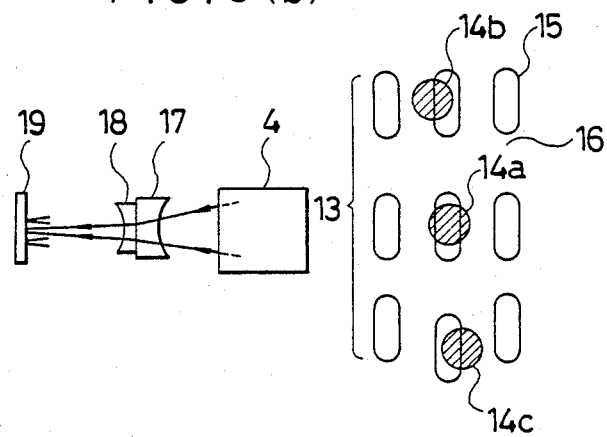

An embodiment of the invention will now be described with reference to FIG. 1. The optical path as reflected from the beam splitter 4 to the photodetector 19 and the optical elements in such an optical path shown in FIG. 3 are omitted from the illustration for the sake of simplicity. According to the invention, a plastic lens formed by molding is used as the converging lens. The position of the gate at the time of molding the plastic lens 10 is indicated by numeral 100.

Figure 2A:
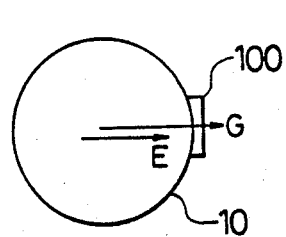
FIG. 2a and FIG. 2b are diagrams showing how the lenses are set according to the invention.
Figure 2B:
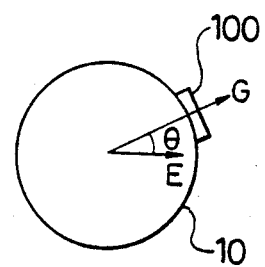

First, let us consider a situation in which the astigmatism due to the phenomena (i), (ii) and (iii) in the optical path from the semiconductor laser 40 to the point just before the converging lens 10 is relatively small, and the light pencil entering the converging lens 10 is not considerably inclined with respect to the optical axis of the converging lens 10, and the light convergence is accomplished with a sufficiently small image height relative to the effective field of vision of the lens. Where the astigmatism which is produced under such conditions is about the same as or smaller than the minimum astigmatism due to the internal strain of the converging lens 10 (for example, the astigmatism is not more than about 0.01 λ rms in the case of the lens shown in FIG. 4), the direction of the gate and the direction of the linear polarization of the light emitted from the semiconductor laser is made to coincide with each other to obtain substantially the minimum astigmatism. This is lustrated in FIG. 2a, in which the arrow E denotes the direction of the polarization and the arrow G denotes the direction of the gate.

Now, let us consider a different situation in which the astigmatism due to the phenomena (i), (ii) and (iii) or the image height of the converging lens 10 is large, that is when the astigmatism is larger than can be neglected as in the above-mentioned situation. In this case, the angle θ between the directions E and G are varied or adjusted to have such a value that the astigmatism which is due the internal strain of the converging lens and which is produced at the time of entry of the linearly polarized light and the astigmatism due to other factors or reasons cancel each other. With such an adjustment, the astigmatism of the entire converging system is minimized.

It was stated in the above description, that the directions E and G may be parallel when the astigmatism due to factors other than the internal strain of the object (converging) lens is small. But this should be construed that the optimum angle for minimizing the astigmatism of the overall converging system is at about 0° or 180°. To be more accurate, θ may be adjusted (in the proximity of 0° or 180°) to the exact optimum value.

In the embodiment described above, no mention was made to the relationship in the relative position between the direction E of the polarization and the direction of extension of the data track. But as was disclosed in the literature (f), an optical head with a better reproduction characteristics can be obtained if the direction E of the linear polarization (which direction is parallel to the junction surface 42 in the case of a semiconductor laser 42) is at right angles with the direction of the track 13. This is because the angle of the light emission is greater in the direction normal to the junction surface than in the direction parallel to the junction surface.

When this is applied to the invention, the relation between the directions E and G and the direction of the track 13 will be as schematically illustrated in FIG. 9. Where the direction E of the polarization is set at right angles with the direction of the track 13, and where the astigmatism other than that due to the internal strain of the object (converging) lens is small (typically not more than 0.01 λ rms as in the embodiment described), the best convergence characteristic is obtained if the direction G of the gate is set parallel with the direction E, as shown in FIG. 9(a). Where the astigmatism is larger, the best convergence characteristic is obtained if the angle θ between the directions E and G is so adjusted that the astigmatism of the overall converging system is minimized.

In the embodiment described above, it is assumed that the converging lens 10 is of an infinite conjugate type (parallel incidence type). But the invention is applicable where a molded plastic lens of a finite conjugate type is used to directly receive and converge the light emitted from the semiconductor laser 40, as illustrated in FIG. 10.

Moreover, with the advancement of precision press technque of glass in recent years, various converging lenses for use in an optical head apparatus have been proposed. It is known that these lenses have double refraction due to internal residual stress, although perhaps to a different degree. With these press-formed glass mold lenses, the angle of retation about the optical axis of the lens may be adjusted to minimize the astigmatism of the overall converging system.

As has been described, the invention provides an improvement in an optical head apparatus whose converging lens is formed by molding. The improvement comprises adjustment or setting of the rotational position of the converging lens with respect to the direction of linear polarization such that the astigmatism of the overall converging system from the light source to the disc is minimized. Accordingly, writing/reproducing performance of the optical head apparatus is substantially improved.

What is claimed is:

1. A method of producing an optical head apparatus of the type having a laser light source device emitting a linearly polarized light beam, and a converging lens for converging the light beam from the laser light source onto information recording tracks on a recording medium, said method comprising the steps of:

molding a plastic material, to form said converging lens whereby the astigmatism of the converging lens against the linearly polarized light beam varies with the rotation of the converging lens about the optical axis; and adjusting the rotary position of the converging lens about the optical axis of the converging lens to minimize the astigmatism of the light beam as converged onto said recording medium.

2. A method of producing an optical head apparatus having an optical system for guiding the light beam emitted from the laser light source to the converging lens according to claim 1, further comprising:

adjusting said rotary position such that the astigmatism due to the converging lens and the astigmatism due to said optical system, said laser light source and image height of said converging lens cancel each other.

3. The method of claim 2, further comprising the step of providing a laser light source which is polarized at right angles with the information recording tracks.

4. An optical head apparatus comprising:

a laser light source device emitting linearly polarized light beam, and a converging lens of the type formed by injecting a plastic material into a mold die through an injection gate, wherein the direction of a line connecting the injection gate and the center of the lens is substantially parallel with the direction of the polarization of the light beam entering the converging lens, for converging the light beam emitted from the laser light source onto information recording tracks on a recording medium for recording information.

5. The apparatus of claim 4, wherein the plastic material comprises PMMA.

6. The apparatus of claim 4, wherein the converging lens is a non-spherical lens of an infinite conjugate type.

7. The apparatus of claim 4, wherein the laser light source device comprises a semiconductor laser, and the converging lens is a non-spherical lens of a finite conjugate type arranged to converge the light pencil emitted from the semiconductor laser onto the recording medium.

8. An apparatus according to claim 4, wherein the direction of the polarization of the laser light source device is at right angles with the tracks.

9. An apparatus according to claim 4, wherein the converging lens is of a finite conjugate type.

10. An apparatus according to claim 4, wherein the direction of the polarization of the laser light source device is at right angles with the tracks.

11. An apparatus according to claim 4 further comprising an optical system including a beam splitter for separating the light beam reflected from the recording medium from the light beam emitted from the laser light source.

12. A method of producing an optical head apparatus of the type having a laser light source device emitting a linearly polarized light beam, and a converging lens for converging the light beam from the laser light source onto a recording medium, said method comprising the steps of:

molding said converging lens by injecting a plastic material into a mold die through an injection gate whereby, the converging lens has an astigmatism against the linearly polarized light beam which varies with the rotation of the converging lens about the optical axis; and setting the direction of the gate at the time of molding the converging lens so that the astigmatism due to the converging lens cancels the astigmatism of the optical system from the laser light source device at the point just before the plastic lens and the astigmatism due to the image height of the light beam which is converged by the converging lens.

13. The method of claim 12, wherein the plastic material comprises PMMA.

14. The method of claim 12, wherein the converging lens is molded so as to form a non-spherical lens of an infinite conjugate type.

15. The method of claim 12, wherein said molding step comprises molding a converging lens of an infinite conjugate type.

16. The method of claim 12, wherein said molding step comprises molding a converging lens of a finite conjugate type.

17. The method of claim 12, further comprising the step of polarizing the laser light source at right angles with the tracks.

* * * * *